United States Patent [19]

Ishino et al.

[11] Patent Number: 5,352,718
[45] Date of Patent: Oct. 4, 1994

[54] ELECTRORHEOLOGICAL SEMISOLID

[75] Inventors: Yuichi Ishino, Fuchu; Takayuki Maruyama, Kodaira; Tasuku Saito, Tokorozawa, all of Japan

[73] Assignee: Bridgestone Corporation, Tokyo, Japan

[21] Appl. No.: 779,906

[22] Filed: Oct. 21, 1991

[30] Foreign Application Priority Data

Oct. 24, 1990 [JP] Japan .................. 2-284389

[51] Int. Cl.$^5$ .......................... C08J 3/00; C08K 3/04; C09K 5/00
[52] U.S. Cl. .......................... 524/66; 524/496; 524/588; 252/73; 252/74; 252/75; 252/78.3
[58] Field of Search .................. 524/63, 65, 66, 496, 524/588; 252/78.3, 73–75, 527

[56] References Cited

U.S. PATENT DOCUMENTS

| | | | |
|---|---|---|---|
| 4,020,014 | 4/1977 | Service et al. | 524/588 |
| 4,588,768 | 5/1986 | Streusand | 524/588 |
| 4,795,592 | 1/1989 | Lander et al. | 524/496 |

FOREIGN PATENT DOCUMENTS

| | | |
|---|---|---|
| 0361106 | 4/1990 | European Pat. Off. . |
| 59-30887 | 2/1984 | Japan . |

OTHER PUBLICATIONS

Yoshihito, O. et al., "Electrically Activated Mechanochemical Devices Using Polyelectrolyte Gels", *Chemistry Letters*, 1285–1288 (1985).

"Standard Test Method for Cone Penetration of Lubricating Grease Using One-Quarter and One-Half Scale Cone Equipment", ASTM, 720–727 (1984).

*Primary Examiner*—Paul R. Michl
*Assistant Examiner*—LaVonda DeWitt
*Attorney, Agent, or Firm*—Sughrue, Mion, Zinn, Macpeak & Seas

[57] ABSTRACT

The present invention relates to an electrorheological semisolid capable of changing the rheological characteristics by an application of voltage. The semisolid is composed of 20–70 weight. Parts of carbonaceous particulates having an average particle size of 0.1–500 $\mu$m and a carbon/hydrogen atomic ratio (C/H ratio) of 1.2–5 which are dispersed in 80–30 weight % of a dispersion medium comprising a partially crosslinked electric insulating polymer having a penetration of 40–475 at 25° C., or into 80–30 weight % of a dispersion medium selected from an electric insulating oil having a viscosity of 5000 to $10^9$ centistokes at 25° C. and an electric insulating polymer having a viscosity of 5000 to $10^9$ centistokes at 25° C.

20 Claims, No Drawings

ELECTRORHEOLOGICAL SEMISOLID

FIELD OF THE INVENTION

The present invention relates to electrotheological semisolids having theological characteristics changeable by an application of electric potential difference.

DESCRIPTION OF THE PRIOR ART

Heretofore, practical application of electrically controllable vibration isolating rubbers, dampers, etc. having electrorheological fluids sealed therein has been studied as mechanical parts capable of producing superior vibration isolating and vibration controlling performance, expecting that the spring characteristics, loss characteristics, etc. of them can be varied appropriately by applying an electric potential difference to the electrorheological fluids sealed therein in respond to varying input vibration.

The electrorheological fluid is, however, a material having fluidity under no application of electric potential difference, and so the fluid must be sealed in a space formed with such solid materials as rubbers, metals and plastics in order to utilize the characteristics of the fluid.

Polymer gels having rheological characteristics variable by an application of electric potential difference are known, however, the gel functions only in such solvents as water, acetone and dimethylsulfoxide. Therefore, their applied devices are restricted to those acting in these solvents.

Accordingly, it has been desired to find out a functional material which has no problem of fluidity like the electrorheological fluids or the polymer gels with solvent, and can change its theological characteristics under an application of electric potential difference.

SUMMARY OF THE INVENTION

The present invention has been accomplished to satisfy the above desire, and aims at providing an electrotheological semisolid having rheological which are changeable in accordance with the strength of an electric potential difference applied thereto.

The present inventors made a study for accomplishing the above object from considerations that an electrotheological substance of a remarkably reduced fluidity was obtainable by the use of an extremely highly viscous electric insulating oil for the dispersion medium or a partially crosslinked dispersion medium. As the result, the present inventors succeeded in finding out a novel functional semisolid having rheological characteristics changeable by an application of electric potential difference.

DETAILED DESCRIPTION OF PREFERRED EMBODIMENTS

The present inventors have found that a semisolid material having rheological characteristics changeable by an application of electric potential difference (voltage) can be obtained by dispersing 20–70 weight parts % of carbonaceous particulates having an average particle size of 0.1–500 μm and a carbon/hydrogen atomic ratio (C/H ratio) of 1.2–5 into 80–30 weight parts % of a dispersion medium comprising a partially crosslinked electric insulating polymer having a penetration of 40–475 at 25° C., or 80–30 weight parts % of a dispersion medium selected from an electric insulating oil having a viscosity of 5000 to $10^9$ centistokes at 25° C. and an electric insulating polymer having a viscosity of 500–$10^9$ centistokes (cSt) at 25° C.

The principle of displaying electrotheological effect in the electrotheological semisolid of the present invention is similar to that in an electrotheological fluid. The mechanism is reasoned that, under an application of electric potential difference, the carbonaceous particulates existing in the dispersion medium are polarized and are attracted each other by an attracting force induced by electrostatic force, which causes changes in rheological properties of the semisolid material as well as rearrangement of the particulates. The main difference from electrorheological fluids is considered that the movement of particulates is so hindered due to the extremely high viscosity or the partial crosslinking of the dispersion medium as to make the particulates unable to link in a fibrous structure between the electrodes under an application of electric potential difference, as can be observed in electrotheological fluids.

Accordingly, it may be understandable that particulates which are suitable as a dispersed phase of an electrotheological fluid are usable in principle for particulates to be dispersed in and actuate the electrorheological semisolids of the present invention. However, such particulates as silica gel and lithium polyacrylate suitable for a dispersed phase of an aqueous electrorheological fluid which necessitates water be contained in the particulates are not preferred for electrorheological semisolids of the present invention, due to the undesirable effect on heat resistance and durability as had been pointed out for electrotheological fluids.

From the above viewpoint, carbonaceous particulates which had been found to be suitable for a dispersed phase of nonaqueous electrorheological fluids are employable for the present invention- The carbonaceous particulates should have a C/H ratio of 1.2–5, preferably 2–4, because a C/H ratio of below 1.2 does not provide the electrotheological effect efficiently, and an excessive electric current flows under an application of electric potential difference (voltage) at a C/H ratio of above 5.

As to the particle size of carbonaceous particulates, a size larger than that for electrotheological fluids is permissible due to less concern about sedimentation. The particulates for bringing about the electrorheological effect efficiently have an average particle size of 0.1–500 μm, preferably 1–100 μm, because an average particle size of above 500 μm makes uniform dispersion of particulates in the dispersion medium difficult and that of below 0.1 μm provides too small electrotheological effect.

The content of carbon in the carbonaceous particulate is preferably 80–97 weight %, more preferably 90–95 weight %.

Generally, the volume resistivity of dispersed phase of an electrorheological fluid is known to be in a semiconductor region, and the volume resistivity of carbonaceous particulates vary according to the C/H ratio and carbon content. A smaller C/H ratio and a lower carbon content increase the volume resistivity near to a insulator region which makes exhibition of the electrorheological effect difficult. A larger C/H ratio and a higher carbon content increase the electric conductivity, which requires unfavorably more electric power for exhibiting the electrorheological effect. From this standpoint, the volume resistivity of carbonaceous particulates for the present invention is $10^5$–$10^{11}$ Ω·cm, preferably $10^7$–$10^{10}$ Ω·cm.

Carbonaceous particulates suitable for the present invention are, for example, (1) finely pulverized coal-tar pitch, petroleum pitch or pitch obtained by thermal decomposition of polyvinylchloride; (2) carbonaceous mesophase spherules obtained by heat-treatment of these pitch or tar component to form optically anisotropic spherules and separating residual pitch component with solvents; pulverized products of these spherules; pulverized bulk mesophase obtained by heat-treatment of raw material pitches (Japanese Patent Provisional Publication Tokkai Sho 59-30887 [1984], etc.); pulverized partially crystallized pitch; (3) particulates of so-called low-temperature-treated carbon like low-temperature carbonized thermosetting resins like phenolic resin microbeads; (4) pulverized coal like anthracite and bituminous coal and their heat-treated products; (5) spherules or pulverized carbonaceous products obtained by heat-treating under pressure mixtures of vinyl-type hydrocarbon polymers like polyethylene, polypropylene or polystyrene and chlorine-containing polymers like polyvinylchloride or polyvinylidenechloride; and (6) carbonized polyacrylonitrile. Among them, especially preferred carbonaceous particulates are carbonaceous mesophase spherules and carbonized phenolic resin microbeads. For the purpose of improving dispersion of particulates or decreasing electric current flow, various kinds of surface treatments of the particulates may be given.

Dispersion media in which carbonaceous particulates of the present invention can be dispersed are classified roughly into partially crosslinked electric insulating polymers and non-crosslinked electric insulating oils or polymers and they are employed from the viewpoint of decreasing the fluidity so extremely as to form a semisolid state when the carbonaceous particulates are dispersed therein to form an electrotheological substance.

Partially crosslinked electric insulating polymers usable for electrorheological semisolids of the present invention have a penetration of 40–475 (based on ASTM D1403), preferably 50–200 and more preferably 60–120, and a volume resistivity of $10^{10}$–$10^{17} \Omega \cdot cm$, preferably $10^{12}$–$10^{17} \Omega \cdot cm$ and more preferably $10^{14}$–$10^{16}$ $\Omega \cdot cm$.

Exemplified materials thereof include partially crosslinked silicone polymers like a partially crosslinked polydimethylsiloxane or a partially crosslinked polymethylphenylsiloxane; partially crosslinked fluorosilicone polymers like a partially crosslinked polymethyltrifluoropropylsiloxane; partially crosslinked hydrocarbon polymers; partially crosslinked halogenated hydrocarbon polymers; partially crosslinked phosphazene polymers and partially crosslinked urethane polymers. Among them, a partially crosslinked gel-type silicone polymer is preferred from the viewpoint of credibility and fabrication, and especially preferred are two-liquid type or one-liquid type silicone gels.

Electric insulating oils on polymers usable for the electrorheological semisolids of the present invention have a viscosity of 5,000–$10^9$ cSt, preferably $10^4$–$10^8$ cSt and more preferably $10^4$–$10^6$ cSt, and a volume resistivity of $10^{10}$–$10^{17}$ $\Omega \cdot cm$, preferably $10^{12}$–$10^{17}$ $\Omega \cdot cm$ and more preferably $10^{13}$–$10^{17}$ $\Omega \cdot cm$.

Exemplified materials thereof include silicone oils like a polydimethylsiloxane or a polymethylphenylsiloxane; silicone polymers; fluorosilicone oils like a polymethyltrifluoropropylsiloxane; hydrocarbon oils; hydrocarbon polymers; halogenated hydrocarbon oils; halogenated hydrocarbon polymers; phosphazene oils and phosphazene polymers. Among them, silicone oils, silicone polymers and fluorosilicone oils are preferred, and especially preferred are polydimethylsiloxane oils, polymethyltrifluorosiloxane oils and polydimethylsiloxane polymers.

In the present invention, weight ratios of the carbonaceous particulates to the dispersing media are that the carbonaceous particulates occupy 20–70 weight parts, preferably 40–60 weight parts and the dispersing media hold 30–80 weight parts, preferably 60–40 weight parts in 100 weight parts of the semisolid. A change in viscosity which is too small is observed when the ratio of carbonaceous particulates is below 20 weight parts, and the ratio of above 70 weight parts brings about difficulty in dispersing the particulates in the medium.

In the present invention, other additives like dispersing agents, crosslinking agents, antioxidants, etc. may be incorporated in an amount which does not deteriorate the effect of invention.

An electrorheological semisolid thus obtained changes electrorheological characteristics when a voltage is applied between electrodes contacting with the semisolid. Under application of the voltage, a material having a storage modulus (G′) of $10^3$–$10^5$ dyne/cm$^2$, when shearing strain is 10% and dynamic frequency is 8 Hz, shows a greater degree of increase in storage modulus G′ than that in a loss modulus (G″) to result a decrease in tan δ (G″/G′), while a material having a G′ of $10^5$–$10^6$ dyne/cm$^2$ under the same experimental condition as above shows nearly the same degree of increase in G′ and G″ to result little change in tan δ. A material having a G′ larger than $10^6$ dyne/cm$^2$ shows a small degree of increase in G′ and only G″ increases to result in an increase in tan δ.

The present invention will be described in detail hereunder by reference to the following Examples but the invention is understood not to be limited to these Examples.

EXAMPLE 1

Coal tar containing no free carbon was heat-treated in a 20 L (liters) autoclave kept at 450° C. under substantially an inert atmosphere. The resulting material was subjected to extraction-filtration with a tar-middle oil, and the filtration residue was heat-treated in a 2 L batch-type rotary reactor kept at 530° C. under a nitrogen gas flow of 2 L/min to obtain carbonaceous particulates. The particulates had an average particle size of 18.8 μm, a C/H ratio of 2.45 and a carbon content of 94.5 weight %.

Into 50 weight parts of a two liquid-type silicone gel having a penetration at 25° C. of 80 (Toray-Dow Corning Co.; SE1887; Volume resistivity $4 \times 10^{14}$ $\Omega \cdot cm$) were dispersed 50 weight parts of the resulting carbonaceous particulates. The disperse system was heated at 80° C. for 1 hour to obtain an electrotheological semisolid.

The measurement of changes in rheology (storage modulus G′, loss modulus G″, tan δ=G″/G′) for the electrorheological semisolid was taken at 25° C. under application of direct current voltage with a rheology-measuring equipment (Rheometrics Co.; RDS-II type). The fixtures were parallel plates of 12.5 mm radius; 10% shearing strain; dynamic frequency 8 Hz; and electrode distance 1.5 mm. The result obtained is shown in Table 1.

TABLE 1

| Applied voltage (KV/mm) | G' (dyne/cm$^2$) | G'' (dyne/cm$^2$) | tan δ | Electric current (mA) |
| --- | --- | --- | --- | --- |
| 0   | $1.57 \times 10^4$ | $3.18 \times 10^4$ | 2.03  | 0 |
| 1   | $6.38 \times 10^4$ | $1.08 \times 10^5$ | 1.694 | 0.0957 |
| 1.5 | $1.05 \times 10^5$ | $1.58 \times 10^5$ | 1.513 | 0.249 |
| 2   | $1.47 \times 10^5$ | $1.99 \times 10^5$ | 1.357 | 0.546 |
| 2.5 | $1.69 \times 10^5$ | $2.05 \times 10^5$ | 1.217 | 0.796 |

EXAMPLE 2

Into 50 weight parts of a two liquid-type silicone gel having a penetration at 25° C. of 60 (Toray-Dow Corning Co.; SE1890; Volume resistivity $1 \times 10^{15}$ Ω·cm) were dispersed 50 weight parts of carbonaceous particulates similar to those of Example 1. The disperse system was heated at 80° C. for 1 hour to obtain an electrorheological semisolid.

The measurement of changes in rheology for the electrorheological semisolid was taken with the same method as Example 1. The result obtained is shown in Table 2.

TABLE 2

| Applied voltage (KV/mm) | G' (dyne/cm$^2$) | G'' (dyne/cm$^2$) | tan δ | Electric current (mA) |
| --- | --- | --- | --- | --- |
| 0   | $3.49 \times 10^5$ | $4.67 \times 10^5$ | 1.337 | 0 |
| 1   | $3.36 \times 10^5$ | $4.64 \times 10^5$ | 1.381 | 0.033 |
| 1.5 | $4.14 \times 10^5$ | $5.78 \times 10^5$ | 1.396 | 0.138 |
| 2   | $4.14 \times 10^5$ | $5.76 \times 10^5$ | 1.391 | 0.167 |
| 2.5 | $4.05 \times 10^5$ | $5.59 \times 10^5$ | 1.380 | 0.204 |

EXAMPLE 3

Coal tar containing no free carbon was heat-treated in a 20 L (liters) autoclave kept at 450° C. under substantially inert atmosphere. The resulting material was subjected to extraction-filtration with a tar-middle oil, and the filtration residue was heat-treated in a 2 L batch-type rotary reactor kept at 500° C. under a nitrogen gas flow of 2 L/min, then pulverized and classified to obtain carbonaceous particulates. The particulates had an average particle size of 3.8 μm, a C/H ratio of 2.38 and a carbon content of 94.7 weight %.

Into 50 weight parts of a silicone gel having a penetration at 25° C. of 80 similar to that of Example 1 were dispersed 50 weight parts of the resulting carbonaceous particulates. The disperse system was heated at 80° C. for 1 hour to obtain an electrorheological semisolid.

The measurement of changes in rheology for the electrorheological semisolid was taken with the same method as Example 1. The result obtained is shown in Table 3.

TABLE 3

| Applied voltage (KV/mm) | G' (dyne/cm$^2$) | G'' (dyne/cm$^2$) | tan δ | Electric current (mA) |
| --- | --- | --- | --- | --- |
| 0   | $1.44 \times 10^4$ | $2.63 \times 10^4$ | 1.823 | 0 |
| 1   | $4.44 \times 10^4$ | $6.81 \times 10^4$ | 1.534 | 0.0039 |
| 1.5 | $6.79 \times 10^4$ | $9.70 \times 10^4$ | 1.429 | 0.0137 |
| 2   | $9.08 \times 10^4$ | $1.22 \times 10^5$ | 1.344 | 0.0293 |
| 2.5 | $1.14 \times 10^5$ | $1.44 \times 10^5$ | 1.268 | 0.0488 |

EXAMPLE 4

Into 50 weight parts of a silicone gel similar to that of Example 2 having a penetration at 25° C. of 60 were dispersed 50 weight parts of carbonaceous particulates similar to those of Example 3. The disperse system was heated at 80° C. for 1 hour to obtain an electrorheological semisolid.

The measurement of changes in rheology for the electrorheological semisolid was taken with the same method as Example 1. The result obtained is shown in Table 4.

TABLE 4

| Applied voltage (KV/mm) | G' (dyne/cm$^2$) | G'' (dyne/cm$^2$) | tan δ | Electric current (mA) |
| --- | --- | --- | --- | --- |
| 0   | $1.05 \times 10^5$ | $2.23 \times 10^5$ | 2.131 | 0 |
| 1   | $1.38 \times 10^5$ | $2.74 \times 10^5$ | 1.986 | 0.0019 |
| 1.5 | $1.82 \times 10^5$ | $3.41 \times 10^5$ | 1.873 | 0.0014 |
| 2   | $2.16 \times 10^5$ | $3.87 \times 10^5$ | 1.792 | 0.0028 |
| 2.5 | $2.46 \times 10^5$ | $4.24 \times 10^5$ | 1.726 | 0.0047 |

EXAMPLE 5

Commercially available phenolic resin microbeads were heat-treated at 600° C. under a nitrogen gas atmosphere to obtain carbonaceous particulates having an average particle size of 8 μm, a C/H ratio of 2.28 and a carbon content of 91.4 weight %.

Into 50 weight parts of a silicone gel similar to that of Example 2 having a penetration at 25° C. of 60 were dispersed 50 weight parts of the resulting carbonaceous particulates. The disperse system was heated at 80° C. for 1 hour to obtain an electrorheological semisolid.

The measurement of changes in rheology for the electrorheological semisolid was taken with the same method as Example 1. The result obtained is shown in Table 5.

TABLE 5

| Applied voltage (KV/mm) | G' (dyne/cm$^2$) | G'' (dyne/cm$^2$) | tan δ | Electric current (mA) |
| --- | --- | --- | --- | --- |
| 0   | $2.93 \times 10^5$ | $4.03 \times 10^5$ | 1.375 | 0 |
| 1   | $2.83 \times 10^5$ | $3.96 \times 10^5$ | 1.399 | 0.00098 |
| 1.5 | $3.47 \times 10^5$ | $4.93 \times 10^5$ | 1.421 | 0.0172 |
| 2   | $4.04 \times 10^5$ | $5.73 \times 10^5$ | 1.418 | 0.0469 |
| 2.5 | $4.13 \times 10^5$ | $5.81 \times 10^5$ | 1.406 | 0.0684 |

EXAMPLE 6

Into 50 weight parts of a fluorosilicone oil composed of a polymethyltrifluoropropylsiloxane having a viscosity of 10,000 cSt at 25° C. (Toshiba Silicone Co.; FQF501-1M; Volume resistivity $3 \times 10^{12}$ Ω·cm; Dielectric constant 7.1) were dispersed 50 weight parts of carbonaceous particulates similar to those of Example 3 to obtain an electrorheological semisolid.

The measurement of changes in rheology for the electrorheological semisolid was taken with the same method as Example 1. The result obtained is shown in Table 6.

TABLE 6

| Applied voltage (KV/mm) | G' (dyne/cm$^2$) | G'' (dyne/cm$^2$) | tan δ | Electric current (mA) |
| --- | --- | --- | --- | --- |
| 0   | $1.42 \times 10^3$ | $4.63 \times 10^4$ | 32.6 | 0 |
| 1   | $6.08 \times 10^4$ | $1.96 \times 10^5$ | 3.22 | 0.019 |
| 1.5 | $9.16 \times 10^4$ | $2.49 \times 10^5$ | 2.71 | 0.040 |
| 2   | $1.17 \times 10^5$ | $2.81 \times 10^5$ | 2.40 | 0.077 |
| 2.5 | $1.34 \times 10^5$ | $2.98 \times 10^5$ | 2.22 | 0.129 |

EXAMPLE 7

Into 50 weight parts of a silicone oil composed of a polydimethylsiloxane having a viscosity of 10,000 cSt at 25° C. (Toshiba Silicone Co.; TSF451-1M; Volume resistivity $1\times10^{14}$ Ω·cm; Dielectric constant 2.75) were dispersed 50 weight parts of carbonaceous particulates similar to those of Example 3 to obtain an electrotheological semisolid.

The measurement of changes in theology for the electrorheological semisolid was taken with the same method as Example 1. The result obtained is shown in Table 7.

TABLE 7

| Applied voltage (KV/mm) | G' (dyne/cm²) | G" (dyne/cm²) | tan δ | Electric current (mA) |
| --- | --- | --- | --- | --- |
| 0 | $3.93 \times 10^3$ | $4.56 \times 10^4$ | 11.58 | 0 |
| 1 | $3.18 \times 10^4$ | $1.18 \times 10^5$ | 3.71 | 0.017 |
| 1.5 | $4.83 \times 10^4$ | $1.53 \times 10^5$ | 3.17 | 0.029 |
| 2 | $6.08 \times 10^4$ | $1.77 \times 10^5$ | 2.91 | 0.051 |
| 2.5 | $7.81 \times 10^4$ | $2.03 \times 10^5$ | 2.59 | 0.089 |

EXAMPLE 8

Into 50 weight parts of a polydimethylsiloxane polymer having a viscosity of $1.5\times10^6$ cSt at 25° C. (General Electric Co.; SE30) were dispersed 50 weight parts of carbonaceous particulates similar to those of Example 1 to obtain an electrotheological semisolid.

The measurement of changes in theology for the electrorheological semisolid was taken with the same method as Example 1. The result obtained is shown in Table 8.

TABLE 8

| Applied voltage (KV/mm) | G' (dyne/cm²) | G" (dyne/cm²) | tan δ | Electric current (mA) |
| --- | --- | --- | --- | --- |
| 0 | $1.47 \times 10^6$ | $7.75 \times 10^5$ | 0.544 | 0 |
| 1 | $1.31 \times 10^6$ | $7.78 \times 10^5$ | 0.595 | 0.007 |
| 1.5 | $1.27 \times 10^6$ | $8.21 \times 10^5$ | 0.644 | 0.048 |
| 2 | $1.27 \times 10^6$ | $8.57 \times 10^5$ | 0.675 | 0.114 |
| 2.5 | $1.32 \times 10^6$ | $8.95 \times 10^5$ | 0.677 | 0.172 |

COMPARATIVE EXAMPLE 1

Into 57.1 weight parts of a silicone oil composed of a polydimethylsiloxane having a viscosity of 10 cSt at 25° C. (Toshiba Silicone Co.; TSF451-10) were dispersed 42.9 weight parts of carbonaceous particulates similar to those of Example 3 to obtain an electrotheological semisolid.

The measurement of changes in rheology for the electrotheological semisolid was taken with the same method as Example 1. The result obtained is shown in Table 9.

TABLE 9

| Applied voltage (KV/mm) | G' (dyne/cm²) | G" (dyne/cm²) | Electric current (mA) |
| --- | --- | --- | --- |
| 0 | ~0 | $1.86 \times 10^2$ | 0 |
| 1 | $8.04 \times 10^3$ | $1.32 \times 10^4$ | 0.022 |
| 1.5 | $1.33 \times 10^4$ | $2.02 \times 10^4$ | 0.059 |
| 2 | $1.73 \times 10^4$ | $2.57 \times 10^4$ | 0.117 |
| 2.5 | $1.98 \times 10^4$ | $3.01 \times 10^4$ | 0.200 |

COMPARATIVE EXAMPLE 2

Into 79.3 weight parts of a silicone oil composed of a polydimethylsiloxane having a viscosity of 1,000 cSt at 25° C. (Toshiba Silicone Co.; TSF451-1000) were dispersed 20.7 weight parts of carbonaceous particulates similar to those of Example 3 to obtain an electrotheological semisolid.

The measurement of changes in rheology for the electrorheological semisolid was taken with the same method as Example 1. The result obtained is shown in Table 10.

TABLE 10

| Applied voltage (KV/mm) | G' (dyne/cm²) | G" (dyne/cm²) | Electric current (mA) |
| --- | --- | --- | --- |
| 0 | ~0 | $7.63 \times 10^2$ | 0 |
| 1 | $1.56 \times 10^3$ | $3.07 \times 10^3$ | 0.0019 |
| 1.5 | $2.39 \times 10^3$ | $3.94 \times 10^3$ | 0.0059 |
| 2 | $3.29 \times 10^3$ | $4.82 \times 10^3$ | 0.0107 |
| 2.5 | $4.55 \times 10^3$ | $6.34 \times 10^3$ | 0.0195 |

The electrotheological semisolids mentioned in Examples 1–8 were viscous semisolids having a certain value of storage modulus (G') under no application of voltage, and their storage modulus (G') and loss modulus (G") increased under application of voltage. In contrast to the above, those mentioned in Comparative Examples 1–2 were non-viscous fluids having a near zero G' under no application of voltage, though their G' and G" increased under application of voltage as indicated in Tables 9–10. The material having a storage modulus G' of $10^3$–$10^5$ dyne/cm² like those of Examples 1, 3, 4, 6 and 7 showed a decrease in tan δ under application of voltage. The material having a G' of $10^5$–$10^6$ dyne/cm² like those of Examples 2 and 5 showed little change in tan δ under application of voltage. The material having a G' of larger than $10^6$ dyne/cm² like that of Example 8 showed an increase in tan δ under application of voltage.

As explained above, a functional semisolid material capable of varying its electrotheological characteristics by application of voltage has been obtained. Functions for electrically controlled vibration isolating rubbers, dampers, etc. which were heretofore performed with electrorheological fluids sealed in containers can now be carried out by the use of the electrotheological semisolid of the present invention being only laminated with electrodes, and simplification of structures of electric controlling system can be achieved.

We claim:

1. An electrorheological semisolid comprising: 20–70 weight parts of carbonaceous particulates having an average particle size of 0.1–500 μm and a carbon/hydrogen atomic ration (C/H ratio) of 1.2–5 dispersed in 80–30 weight parts of a dispersion medium comprising a partially crosslinked electric insulating polymer having a penetration of 40–475 at 25° C.

2. An electrorheological semisolid according to claim 1, wherein the carbonaceous particulates have an average particle size of 1–100 μm.

3. An electrorheological semisolid according to claim 1, wherein the carbonaceous particulates contains 80–97 weight % of carbon.

4. An electrorheological semisolid according to claim 1, wherein the carbonaceous particulates have a volume resistivity of $10^5$–$10^{11}$ Ω·cm.

5. An electrorheological semisolid according to claim 1, wherein the carbonaceous particulates are selected from the group consisting of particulates of finely pulverized coal-tar pitch, petroleum pitch or pitch obtained by thermal decomposition of polyvinylchloride; carbonaceous mesophase spherules obtained by heat-treatment of these pitch or tar component to form optically anisotropic spherules and separating residual pitch component with solvents; pulverized products of these spherules; pulverized bulk mesophase obtained by heat-treatment of raw material pitches; pulverized partially crystallized pitch; and low-temperature carbonized thermosetting resins.

6. An electrorheological semisolid according to claim 5, wherein the low-temperature carbonized thermosetting resins are carbonized phenolic resin microbeads.

7. An electrorheological semisolid according to claim 1, wherein the partially crosslinked electric insulating polymer has penetration of 40–475 and a volume resistivity of $10^{12}$–$10^{17}$ $\Omega$·cm at 25° C.

8. An electrorheological semisolid according to claim 7, wherein the partially crosslinked electric insulating polymer has penetration of 50–200 and a volume resistivity of $10^{12}$–$10^{17}$ $\Omega$·cm at 25° C.

9. An electrorheological semisolid according to claim 8, wherein the partially crosslinked electric insulating polymer has penetration of 60–120 and a volume resistivity of $10^{14}$–$10^{16}$ $\Omega$·cm at 25° C.

10. An electrorheological semisolid according to claim 7, wherein the partially crosslinked electric insulating polymer is a two-liquid type or one-liquid type silicone gel.

11. An electrorheological semisolid comprising:
20–70 weight parts of carbonaceous particulates having an average particle size of 0.1-14 500 μm and a carbon/hydrogen atomic ration (C/H ratio) of 1.2–5 dispersed in 80–30 weight parts of a dispersion medium selected from an electric insulating oil having a viscosity of 5000 to $10^9$ centistokes at 25° C. and an electric insulating polymer having a viscosity of 5,000 to $10^9$ centistokes at 25° C.

12. An electrorheological semisolid according to 11, wherein the electric insulating oil or electric insulating polymer has a volume resistivity of $10^{10}$–$10^{17}$ $\Omega$·cm at 25° C.

13. An electrotheological semisolid according to claim 12, wherein the electric insulating oil or electric insulating polymer has a viscosity of $10^4$ to $10^8$ centistokes and a volume resistivity of $10^{12}$–$10^{17}$ $\Omega$·cm at 25° C.

14. An electrorheological semisolid according to claim 13, wherein the electric insulating oil or electric insulating polymer has a viscosity of $10^4$–$10^6$ centistokes and a volume resistivity of $10^{13}$–$10^{17}$ $\Omega$·cm at 25° C.

15. An electrorheological semisolid according to claim 11, wherein the electric insulating oil or electric insulating polymer is a silicone oil, a silicone polymer or a fluorosilicone oil.

16. An electrorheological semisolid according to claim 11, wherein the carbonaceous particulates have an average particle size of 1–100 μm.

17. An electrorheological semisolid according to claim 11, wherein the carbonaceous particulates contains 80–97 weight % of carbon.

18. An electrorheological semisolid according to claim 11, wherein the carbonaceous particulates have a volume resistivity of $10^5$–$10^{11}$ $\Omega$·cm.

19. An electrorheological semisolid according to claim 11, wherein the carbonaceous particulates are selected from the group consisting of particulates of finely pulverized coal-tar pitch, petroleum pitch or pitch obtained by thermal decomposition of polyvinylchloride; carbonaceous mesophase spherules obtained by heat-treatment of these pitch or tar component to form optically anisotropic spherules and separating residual pitch component with solvents; pulverized products of these spherules; pulverized bulk mesophase obtained by heat-treatment of raw material pitches; pulverized partially crystallized pitch; and low-temperature carbonized thermosetting resins.

20. An electrorheological semisolid according to claim 19, wherein the low-temperature carbonized thermosetting resins are carbonized phenolic resin microbeads.

* * * * *